Patented Sept. 16, 1952

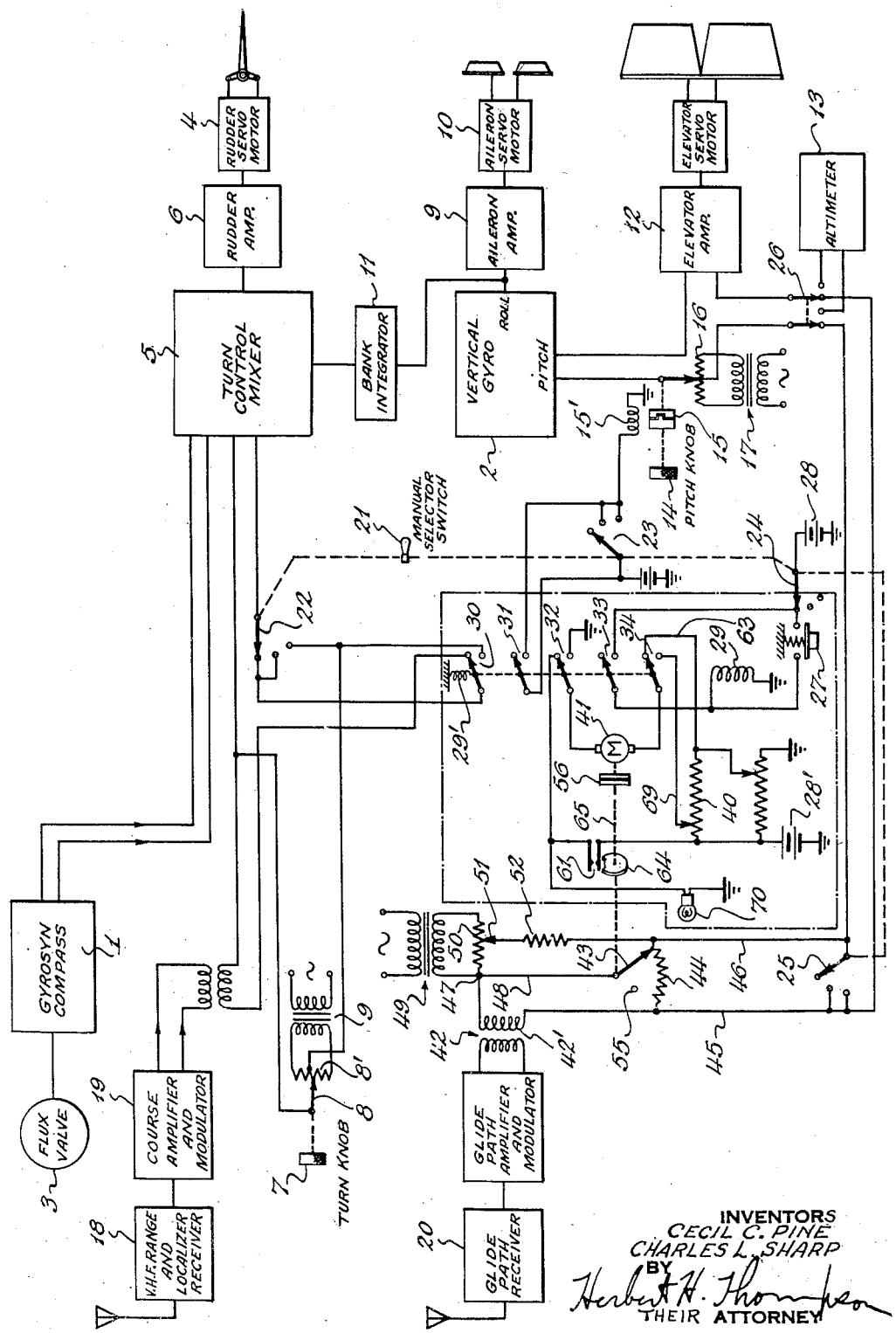

2,611,128

UNITED STATES PATENT OFFICE 2,611,128

SAFETY DEVICE FOR AUTOMATIC APPROACH SYSTEMS

Cecil C. Pine, Lake Ronkonkoma, and Charles L. Sharp, Setauket, N. Y., assignors to The Sperry Corporation, a corporation of Delaware Application March 10, 1950, Serial No. 148,836

10 Claims. (Cl. 343—108)

1

This invention relates to automatic approach systems for aircraft. In aircraft equipped with automatic pilots it is now possible not only to fly the aircraft normally through the automatic pilot with or without radio guidance such as furnished by omnidirectional guidance, but also to bring it down to a landing field through overcast by means of ILS radio guidance beams operating through the automatic pilot, usually known as localizer beams for azimuth reference and glide path or glide slope beams for control in elevation. For instance, such systems are described in the prior patents to Moseley 2,423,337, dated July 1, 1947, for Radio Controlled Pilot System and J. C. Newton, 2,429,642, dated October 28, 1947, for Aircraft Control Apparatus and the copending application of Peter J. Chenery, Serial No. 91,913, filed May 7, 1949, for Automatic Flight Control Apparatus. Frequently it happens, however, that when the aircraft is near the ground a change of plan becomes necessary so that the craft must at once be flown up away from the landing strip and perhaps go around for another approach. When this happens the pilot must cease coming down the glide path and must immediately trim the aircraft to a greater angle of attack and must preferably also "gun" the engine to climb away from the field and avoid obstacles beyond the runway. Since the aircraft is under complete automatic control at this time, the present invention concerns a means for bringing about the above desired result while maintaining automatic control, and thus avoid a sudden transition to manual control resulting in a loss of precious seconds while the pilot adjusts his vision and reflexes.

According to our invention, we provide an extra switch on the automatic pilot which when operated preferably severs the control at least from the glide path radio receiver and gradually sets the elevator for fly up trim. At this time the signal from the localizer beam may also be severed or modified. While we have shown manual means for operating this "go around" switch, it will be understood that automatic means for doing so is also contemplated. The within application is related to applicants' prior application Serial No. 144,834 for Safety Device for Instrument Approach Systems, filed February 17, 1950, the broader claims being reserved for said first filed application.

The single figure of the drawings is a diagrammatic elementary or functional wiring diagram of a radio guided automatic pilot in which our invention is incorporated. A conventional automatic pilot system of the electronic control type is represented in the diagram having an azimuth control or compass unit 1 and an attitude control unit or units 2. The former is preferably in the form of a directional gyro slaved from a flux valve compass 3 and known in the art as a gyro magnetic compass. The signal generated or picked off from this unit normally controls the rudder servo motor 4 through a mixer 5 or summation unit and amplifier 6. Radio guidance from omnidirectional range signals (or localizer signals) may also be led into the mixer 5, so that the rudder is controlled jointly by a radio guidance signal supervised from the compass. Turns at a controlled rate may be accomplished through a turn knob 7 operating the slider 8 of a potentiometer 8' across the secondary of transformer 9.

The attitude reference 2 is usually in the form of a gyro-vertical having both pitch signal pick-offs and roll signal pick-offs. The latter may be fed into the aileron amplifier 9 and to the servo motor 10, but automatic bank signals may also be introduced into the same from the mixer 5 through the bank integrator 11. Similarly, the pitch signals govern the elevator amplifier 12 after being mixed for normal flight with signals from any one of the altimeter 13, the pitch knob 14 or the glide path signal from receiver 20.

Changes of pitch are shown as effected through said pitch knob 14 operating, through clutch 15, the slider of potentiometer 16 across the secondary of a transformer 17 by which biasing signals are mixed with the pitch signals from the gyro 2. When it is desired to make an automatic landing along the glide path beam, the altimeter is disconnected by switch 26 and the pitch signal from the gyro-vertical 2 is mixed with a guidance signal from the glide path receiver 20, at which time clutch 15 is out so that no change of pitch can be made by hand.

The functioning of the automatic pilot is controlled through a manual selector switch handle 21 shown as having three positions and operating a plurality of separate switches 22, 23, 24 and 25. Said switch handle may also be connected to the altimeter transfer switch 26, if desired, although the altimeter switch is preferably separately controlled. Normally, the manual selector switch 21 is in the lowermost position for normal automatic flight. In this position the rudder amplifier is under the control of the compass and the turn knob 7, as will be seen from the lowermost position of switch 22. At the same time the switch 23 excites the winding 15' on pitch knob clutch 15, so that the pitch knob may control the pitch through potentiometer 16. Switch 24 at that time is on a dead contact and switch 25 shorts out any signals which might be generated at the glide path receiver 20. In this position, therefore, the craft is under automatic control in azimuth, elevation and roll from the two gyroscopes, supervised by the hand knobs 7 and 14. At that time also the switch 26 usually connects in altimeter 13, switch 25 being on the bottom contact.

If, however, the pilot decides to fly on the radio range, he moves the manual selector switch 21 to the mid-position. In this position switch 22 disconnects the turn knob control 7 and connects the output of the receiver 18 (tuned to a radio range transmitter) and its amplifier 19 to the mixer 5. In this position, however, the glide path receiver output is still short-circuited by the switch 25.

When the plane is approaching its destination and it is desired to land, the pilot tunes the receiver 18 to the localizer beam at the airport, and the selector switch 21 is moved to its uppermost position. In this position the output of the amplifier 19 remains connected to the mixer 5, which amplifier is then under the control of the localizer beam. Switch 23 is then in the position shown in the drawings in which the coil 15' of the pitch knob clutch is deenergized to disconnect the same. Switch 24 at that time is closed to alert or render operative the "go around" push button 27, the function of which will be described hereinafter. At this time also, the short-circuit to the glide path receiver is broken at switch 25, so that the glide path receiver output is then mixed with the pitch signals from the gyro-vertical 2 to operate the elevator amplifier 12.

In normal flight it is to be understood that the automatic pilot may be under the control of either the altimeter 13 in elevation or the pitch control knob 14, and that the altimeter connection is always severed when the manual selector switch 21 is in the uppermost position for automatic approach at switch 25.

Except for the push button 27 and its associated switch 24, the parts so far described are intended to represent the general elements of an airplane automatic pilot equipped for radio guidance and blind landing.

The button or switch 27 is provided for the purpose of enabling the automatic pilot to fly the airplane safely away from the landing field in case it is desired at the last minute not to land for any reason. It is preferably placed on the throttle of the engine so that the engine power may be increased simultaneously with the pushing of the button.

In general the system is so designed that when the "go around" button is actuated the following functions are automatically accomplished immediately:

1. The descent signal from the glide path control is gradually reduced and a nose-up signal is gradually applied.
2. The pilot's pitch control knob 14 is rendered effective so that further pitch adjustment may be readily secured, if desired.
3. The control from the localizer beam is disconnected and the pilot's control knob 7 again rendered effective.
4. A signal lamp 70 may be flashed to show when the "go around" feature is in operation.
5. After the aircraft has been maneuvered to a safe altitude, the "go around" circuits are preferably recycled by returning the manual selector switch 21 to its regular position, which throws the gyro pilot back into normal control. At the same time the arbitrary nose-up signal applied by the operation of the "go around" button is promptly removed, so that the pilot may resume control through the pitch knob 14 and/or the altimeter 13.
6. The gyro controls from 1 and 2 are left in supervisory control at all times.

Switch 27, which may be manually or automatically operated, is shown as placing a source of current 28 in circuit with a holding solenoid 29 which pulls down gang switches 30, 31, 32, 33 and 34 when excited, against biasing spring 29'. The switch 33 operates to complete a holding circuit so the switches will be held down after the button 27 is released. When switches 22 and 30 are up, the input to the mixer 5 from the turn knob potentiometer 8 is severed and transferred to the output of the amplifier 19, which is then fed from the receiver 18 tuned to the localizer beam. The craft will then be guided in azimuth accurately along this beam directly to the runway. Depressing switch 30 severs the signal from amplifier 19 and reestablishes turn control through knob 7. At the same time the closing of the switch 31 will excite the solenoid 15' of clutch 15 to connect the potentiometer 16 to the pitch knob, and the closing of switches 32 and 34 will complete a circuit from the power source 28' through the resistors 40 through a small servo motor 41 to ground.

The function of the servo motor 41 is to gradually buck out or cancel the glide path descent signal being received from the glide path amplifier through the coupling transformer 42. Upon rotation the motor slowly turns the slider 43 wiping across a resistor 44 connected across the leads 45, 46. Lead 45 is shown as connected to one end of the output winding 42' of transformer 42. At the other end, said winding is connected to a current dividing point 47, one lead 48 from said point being connected to the aforesaid slider 43, another lead to one end of the secondary of bucking transformer 49 and a third lead to a resistor 50 across the output of the transformer 49. Resistor 50 has a variable tap 51 connected through resistor 52 to the aforesaid lead 46. With the slider 43 in the position shown in the drawings, it will be seen that substantially the total E. M. F. of winding 42' is supplied to leads 45 and 46 connected to the input of the elevator amplifier 12 and hence the entire glide path signal is fed thereto in combination with the pitch signal from the gyro-vertical 2. When the motor is started, however, it will rotate the slider 43 clockwise thereby gradually reducing the glide path signal and gradually introducing an opposing signal from transformer 49 and its connected potentiometer 51. The signal from the potentiometer 51 is adjusted so as to cause the ascent of the airplane at a predetermined safe angle when the glide path signal is shorted out. A stop 55 is preferably provided to stop the movement of the arm 43 when the glide path signal is suppressed. When the stop is struck the motor is allowed to continue to rotate by means of a slip clutch 56. The airplane will then continue to climb at whatever rate is set by potentiometer 51 until the pilot feels that he is a safe distance above the airport. He then may move the selector switch handle 21 to its downmost position thus reestablishing normal automatic control.

The circuits are also so arranged that the motor 41 will be driven in the opposite direction at that time to restore the potentiometer 43 to its normal position as shown in the drawings. This result is shown as accomplished by the fact that the switch 24 at that time will break the hold-in circuit to the solenoid 29 thereby permitting the opening of biased gang switches 30, 31, 32, 33 and 34 to the position shown in the drawings. In this position the current from the supply source 28' to the motor 41 through lead 69, switch 34 and switch 32 to ground will be broken and a reverse connection made to the motor armature from the supply source 28' through contact 61 (which is closed by cam 64 at the time) switch 32 and switch 34 and lead 63 to ground. Hence the motor will be driven in the opposite direction to reposition the arm 43 until the contact 61 is opened when the depression on cam 64 on the motor shaft 65 reaches the biased contacts 61. On the other hand, open contact 61 will not interfere with driving the motor in the opposite direction when button 27 is depressed because the circuit to the motor does not include this contact under "go around" conditions. Preferably warning light 70 is placed in circuit with button 61 to show whenever the automatic "go around" mechanism is functioning.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An automatic approach system for aircraft having an automatic pilot including radio guidance means for causing the craft to glide downwardly toward a landing field through said automatic pilot, emergency means operable by the aviator for severing said radio means from control of the automatic pilot, and means for simultaneously and automatically adjusting said automatic pilot to cause ascent of the craft upon operation of said emergency means.

2. An automatic approach system for aircraft having an automatic pilot including radio guidance means for causing the craft to fly toward and glide downwardly toward a landing field through said automatic pilot, emergency means for gradually rendering ineffective said radio means from control of the automatic pilot, and gradually adjusting at the same time said automatic pilot to cause ascent of the craft at a predetermined rate.

3. In a radio approach system for automatic landing of aircraft having a glide path receiver and an automatic pilot including means for generating a trim or pitch guidance signal, an attitude maintaining instrument, said guidance means being responsive to signals produced by both said receiver and said attitude instrument, normally idle means for biasing the signal from said instrument to call for a climb at a predetermined angle, and manually operable means for rendering said guidance means responsive only to the signal from the attitude instrument biased from said biasing means whereby ascent from the landing field is caused through the automatic pilot.

4. In a radio approach system for automatic landing of aircraft having a glide path receiver and an automatic pilot including means for generating a trim or pitch guidance signal, an attitude maintaining instrument, said guidance means being responsive to signals produced by both said receiver and said attitude instrument, normally idle means for biasing the signal from said instrument to cause a climb at a predetermined angle, and means for severing the radio receiver signal from the guidance means and transferring the same to said biasing means whereby a fly up signal from the attitude instrument is transmitted and ascent of the craft caused by the automatic pilot.

5. A radio guided automatic pilot for aircraft adapted for automatic approach or blind landing including a glide path receiver creating a signal causing descent along the radio glide path in conjunction with the pitch control signal of the gyro-vertical of said pilot, safety means for causing said pilot to cause the craft to fly up when near landing including a counter or fly up signal producing means for opposing the descent signal from said receiver, and means for gradually shifting the control from said receiver to said fly up signal while leaving said gyro signal in supervision.

6. A radio guided automatic pilot for aircraft adapted for automatic approach or blind landing including a glide path receiver creating a signal causing descent along the radio glide path in conjunction with the pitch control signal of the gyro-vertical of said pilot, safety means for causing said pilot to cause the craft to fly up when near landing including a counter or fly up signal producing means for opposing the descent signal from said receiver, means for gradually shifting the control from said receiver to said fly up signal while leaving said gyro signal in supervision, and means for reversing and recycling said shifting means upon restoration of the automatic pilot to normal flight operation.

7. A radio guided automatic pilot for aircraft as claimed in claim 6 having manual pitch and turn control knobs which are rendered inoperative during radio glide path descent, and means brought into action by said shifting means for restoring said knobs to control.

8. An automatic approach system for aircraft having an automatic pilot including radio guidance means for causing the craft to glide downwardly toward a landing field through said automatic pilot and a pitch control knob for manually altering the pitch through said automatic pilot, means for rendering said knob inoperative while said radio guidance means is functioning, emergency means for severing said radio means from control of the automatic pilot, and means for simultaneously causing said automatic pilot to cause ascent of the craft, and restoring said knob to operative condition.

9. An automatic approach system for aircraft having an automatic pilot including radio guidance means for causing the craft to fly toward and glide downwardly toward a landing field through said automatic pilot and pitch and turn control knobs for manually altering the pitch and course through said automatic pilot, means for rendering said knobs inoperative while said radio guidance means is functioning, emergency means for severing said radio means from control of the automatic pilot, and means for simultaneously causing said automatic pilot to cause ascent of the craft and restoring said knobs to operative condition.

10. An automatic approach system for aircraft having an automatic pilot including an altimeter operating through said automatic pilot for maintaining a preset altitude and alternative radio guidance means for causing the craft to glide downwardly toward a landing field through said automatic pilot, interlocking means for throwing in said radio means and throwing out said altimeter from the control of said pilot, emergency means for severing said radio means from control of the automatic pilot, and means for simultaneously causing said automatic pilot to cause ascent of the craft and rendering said altimeter control possible.

CECIL C. PINE.
   CHARLES L. SHARP.

REFERENCES CITED

The following references are of record in the file of this patent:

UNITED STATES PATENTS

| Number | Name | Date |
| --- | --- | --- |
| 2,133,285 | Dunmore | Oct. 18, 1938 |
| 2,322,225 | Crane et al. | June 22, 1943 |
| 2,423,337 | Moseley | July 1, 1947 |
| 2,429,642 | Newton | Oct. 28, 1947 |
| 2,499,349 | Ayres | Mar. 7, 1950 |